United States Patent
Nakayama et al.

(10) Patent No.: US 6,782,867 B2
(45) Date of Patent: Aug. 31, 2004

(54) DIRECT INJECTION GASOLINE ENGINE

(75) Inventors: Yoko Nakayama, Hitachi (JP);
Toshiharu Nogi, Hitachinaka (JP);
Takuya Shiraishi, Hitachinaka (JP);
Yusuke Kihara, Hitachi (JP); Tohru Ishikawa, Kitaibaraki (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 10/052,631

(22) Filed: Jan. 23, 2002

(65) Prior Publication Data

US 2003/0066508 A1 Apr. 10, 2003

(30) Foreign Application Priority Data

Oct. 9, 2001 (JP) ........................................ 2001-310843

(51) Int. Cl.[7] .............................. F02B 3/02; F02B 17/00
(52) U.S. Cl. ...................... 123/295; 123/297; 123/299; 123/301; 123/305; 239/533.12
(58) Field of Search ................................ 123/295, 297, 123/298, 299, 301, 302, 305; 239/5, 468, 533.12

(56) References Cited

U.S. PATENT DOCUMENTS

| | | | | |
|---|---|---|---|---|
| 4,852,525 A | * | 8/1989 | Ishida | .......................... 123/276 |
| 5,086,737 A | * | 2/1992 | Watanabe et al. | ............ 123/295 |
| 5,724,937 A | | 3/1998 | Bezner et al. | ............... 123/275 |
| 5,927,244 A | * | 7/1999 | Yamauchi et al. | ........... 123/295 |
| 6,003,488 A | * | 12/1999 | Roth | ........................... 123/298 |
| 6,138,637 A | * | 10/2000 | Bubeck | ....................... 123/295 |
| 6,334,427 B1 | * | 1/2002 | Nakayama et al. | .......... 123/305 |
| 6,557,532 B1 | * | 5/2003 | Nakayama et al. | ..... 123/299 X |

FOREIGN PATENT DOCUMENTS

| | | |
|---|---|---|
| EP | 1 108 877 A2 | 6/2001 |
| FR | 2 807 103 | 4/2000 |
| JP | 6-42352 | 2/1994 |
| JP | 10-131756 | 5/1998 |

* cited by examiner

Primary Examiner—Tony M. Argenbright
(74) Attorney, Agent, or Firm—Crowell & Moring LLP

(57) ABSTRACT

In a center injection type of direct injection engine, since it has an ignition plug and an injector arranged in proximity, there occurs the problem that a sprayed liquid fuel directly strikes the ignition plug and causes the plug to misfire. A notch is to be provided at a portion of the injector end so as to form a coarse-grained portion and a dense portion in sprays of fuel, and the injector is disposed so that the coarse-grained portion is directed towards the ignition plug. It is possible to avoid the misfiring of the ignition plug and thus prolong the life of the plug, by preventing a liquid fuel from directly striking the plug.

33 Claims, 18 Drawing Sheets

FIG. 3
(a)
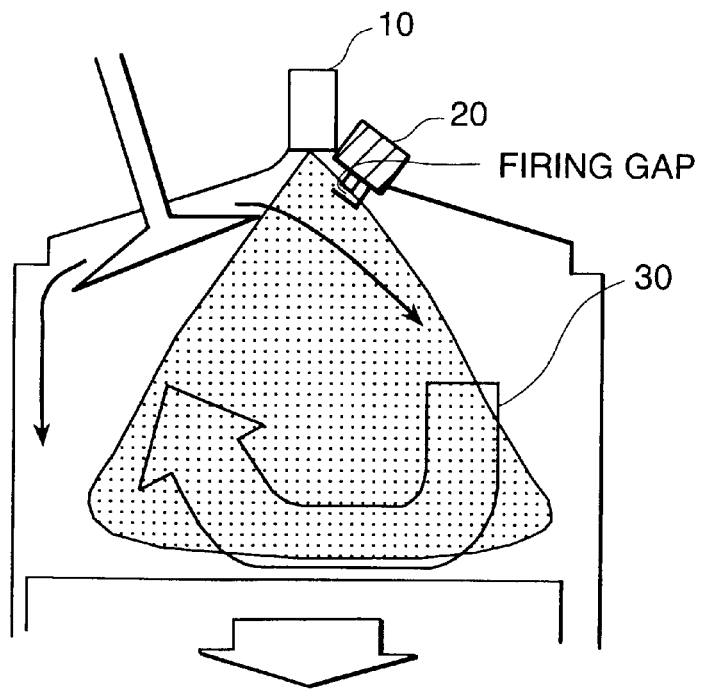
FIRING GAP
(b)
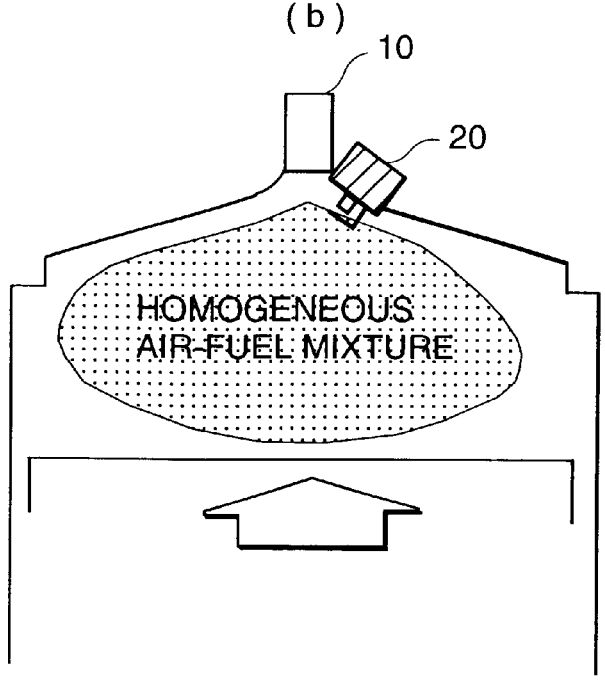
HOMOGENEOUS AIR-FUEL MIXTURE

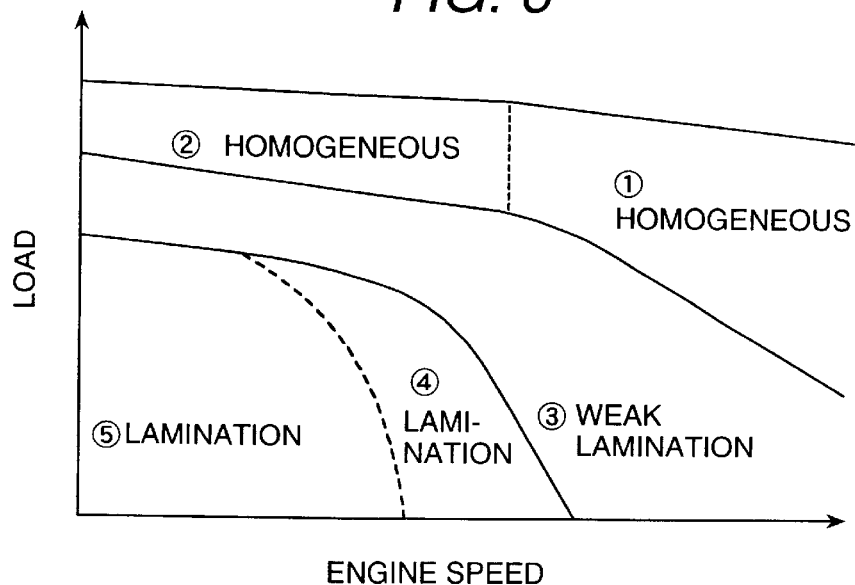

FIG. 15
(a)
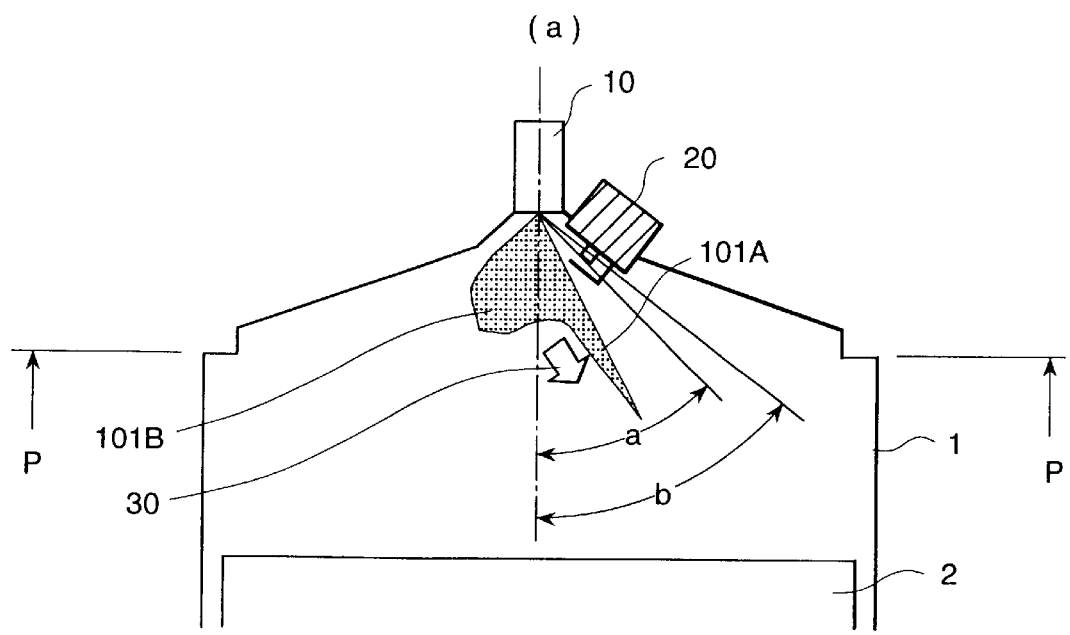
(b)
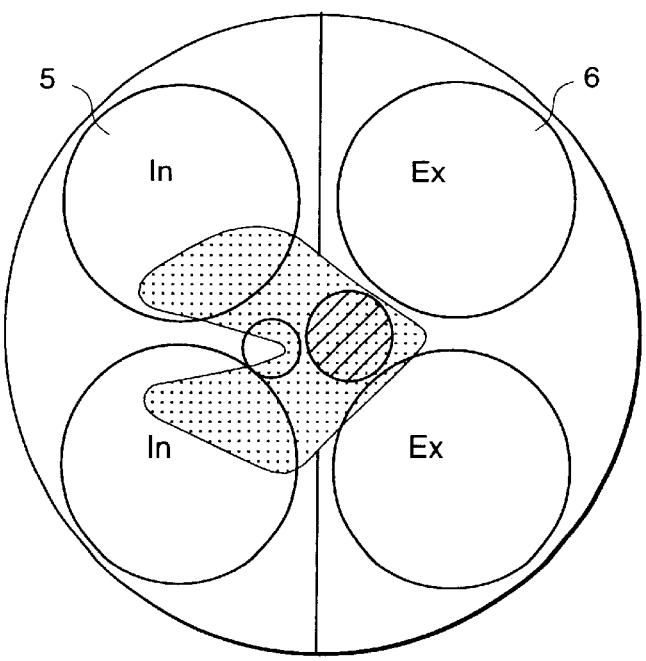

FIG. 18
(a)
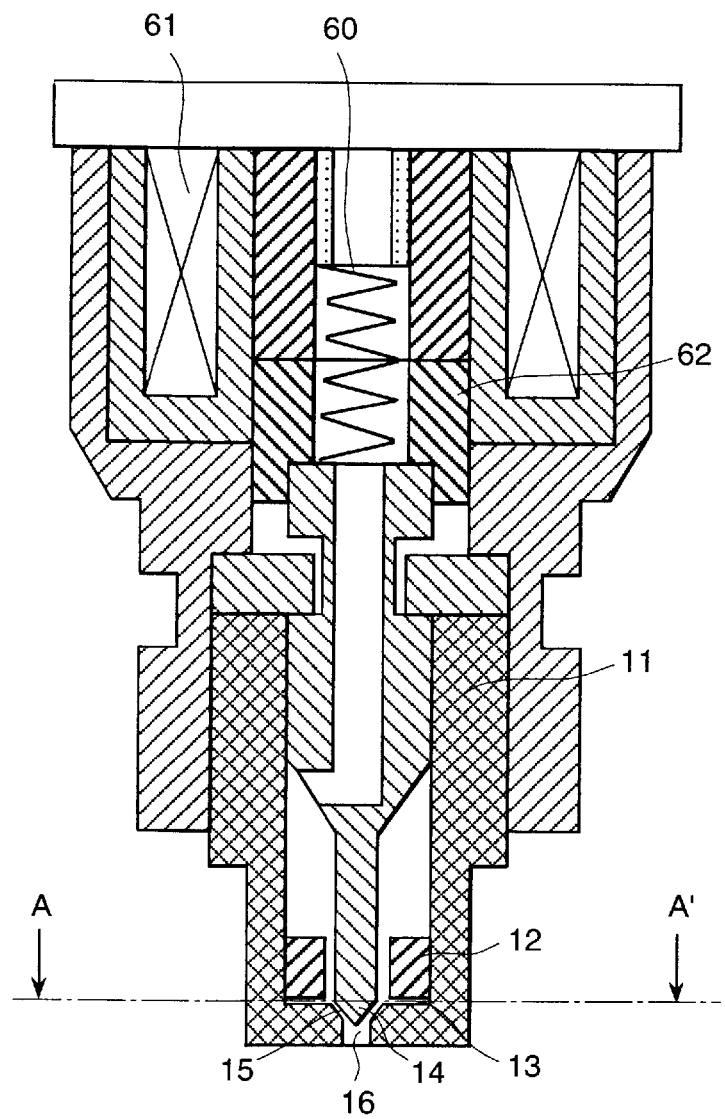
(b)
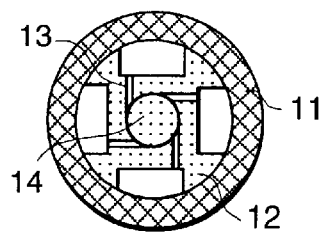
DETAILED OF CROSS
SECTION A-A'

DETAILED OF CROSS SECTION A-A

DETAILED OF CROSS SECTION A-A (a)

(b) ↑P

DETAILED OF CROSS SECTION A-A (a)

(b) ↑P

DETAILED OF CROSS SECTION A-A

FIG. 27
(a)
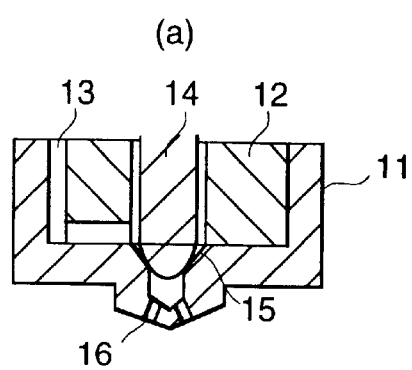
(b)
FIG. 28
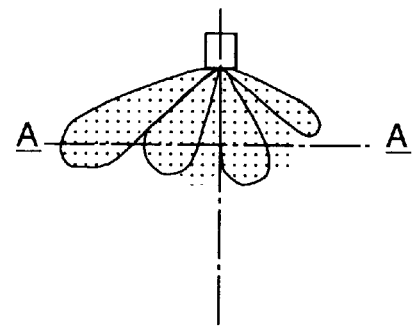
DETAILED OF CROSS
SECTION A-A
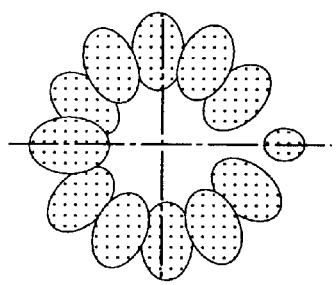

DIRECT INJECTION GASOLINE ENGINE

BACKGROUND OF THE INVENTION:

1. Field of the Invention

The present invention relates to a direct injection-type spark ignition engine that supplies a fuel directly to the inside of a combustion chamber.

2. Prior Art

In conventional direct injection engines, the injector is provided at an angle from 20 to 50 degrees with respect to the horizontal face of the combustion chamber, under the air intake ports thereof.

These engines are constructed so that during stratified combustion, a fuel is injected towards the cavity provided in the piston and then an air-to-fuel mixture is ignited by being introduced into the ignition plug located in the upper center of the combustion chamber, in combination with the air flow created by the flow creation means, such as swirl control valve, that is located at the intake ports.

Japanese Application Patent Laid-Open Publication No. Hei 06-42352 describes art by which, in a center injection type of direct injection gasoline engine having an injector in the central top of the combustion chamber and injecting the fuel towards the piston, the ignition plug is struck directly with sprays of fuel and the density of the air-fuel mixture is controlled with high accuracy.

Japanese Application Patent Laid-Open Publication No. Hei 10-131756 describes an engine which, as with the above art, is provided with an injector for injecting a fuel from nearly the top center of the combustion chamber towards the piston, with a cavity in the valve portion at the top of the piston, and with an ignition plug at where it is offset both inside the cavity and at the air intake valve end. Since the ignition plug is located so that sprays of fuel do not directly strike the plug, the shape of the piston and the flow of air ensure intensive supply of the mixture to the ignition plug and stabilize stratified combustion.

However, for the center injection type of direct injection gasoline engine described in Japanese Application Patent Laid-Open Publication No. Hei 06-42352, since the ignition plug is struck with the fuel directly and actively, consideration is not given to the occurrence of a misfire due to the sticking of a liquid fuel to the plug, or to the deterioration of combustion stability, associated with the misfire.

In addition, for the center injection type of direct injection gasoline engine described in Japanese Application Patent Laid-Open Publication No. Hei 10-131756, since the piston shape and the flow of air are optimized to stratify the mixture, the occurrence of unburnt hydrocarbon, soot, and the like due to the combustion of any fuel components sticking to the piston is likely to deteriorate exhaust performance. Furthermore, there are the problems that a flow creation means, piston machining, and sophisticated control are required and that the costs are high.

SUMMARY OF THE INVENTION

The present invention is intended to solve the above-mentioned problems associated with the prior art, and an object of the invention is to prevent the ignition plug from being directly struck with a liquid fuel, by optimizing the fuel spraying pattern and thus to suppress the misfiring of the ignition plug and the instability of combustion, associated therewith.

Another object of the invention is to provide a spraying control means for stabilizing combustion, by minimizing the support of the air flow and piston shape and achieving stratification based on spraying characteristics.

In a direct injection type of spark ignition internal-combustion engine which injects gasoline directly into the combustion chamber and has an injector near the upper center thereof and an ignition plug in the neighborhood of the injector, an injector for creating coarse-grained and dense sprays of fuel is combined and the coarse-grained spray is directed towards the ignition plug.

In a direct injection type of spark ignition internal-combustion engine which injects gasoline directly into the combustion chamber and has an injector near the upper center thereof and an ignition plug in the neighborhood of the injector, an injector for creating coarse-grained and dense sprays of fuel is combined and the sense spray is directed towards the bottom of the ignition plug.

The injector described above has the structure where it has a stepped portion in the direction of the injector central axis at the open exit end of the injection hole.

The injector described above has the structure where it has a multitude of injection holes.

The injector described above has the structure where a portion of the injection hole is provided with a shielding plate to cut a portion of the spray.

In the injector structure described above, the injector and the ignition plug are integrated into a single unit.

In the direct injection internal-combustion engine described above, gasoline is injected a plurality of times during one cycle consisting of air intake, compression, expansion, and exhaust.

BRIEF DESCRIPTION OF THE DRAWINGS

FIG. 3(a) is an explanatory view of the homogeneous-mixture distribution obtained during the initial phase of spraying based on the first embodiment, and FIG. 3(b) is an explanatory view of the mixture distribution obtained toward the end of spraying;

FIG. 6 is a chart explaining the relationship between stratification and homogeneous operating regions and an injection control method;

FIG. 7 is a diagram explaining the injection timing in each region of FIG. 6;

FIG. 15(a) is a cross-sectional view of the engine pertaining to a second embodiment, and FIG. 15(b) is a view of cross section (a) above when seen from the direction of arrow-marked line P–P';

FIG. 18(a) is a cross-sectional view of the injector pertaining to the present invention, and FIG. 18(b) is a view of injector (a) above when seen from the direction of arrow-marked line A–A';

FIG. 27(a) is an enlarged cross-sectional view of the end portion of the injector of FIG. 18 in a fifth embodiment, and FIG. 27(b) is a cross-sectional view of end portion (a) above when seen from the direction of arrow P;

FIG. 28 is a set of views showing the spray pattern of the fuel injected from the injector of FIG. 27.

DESCRIPTION OF THE INVENTION

Figure 29:
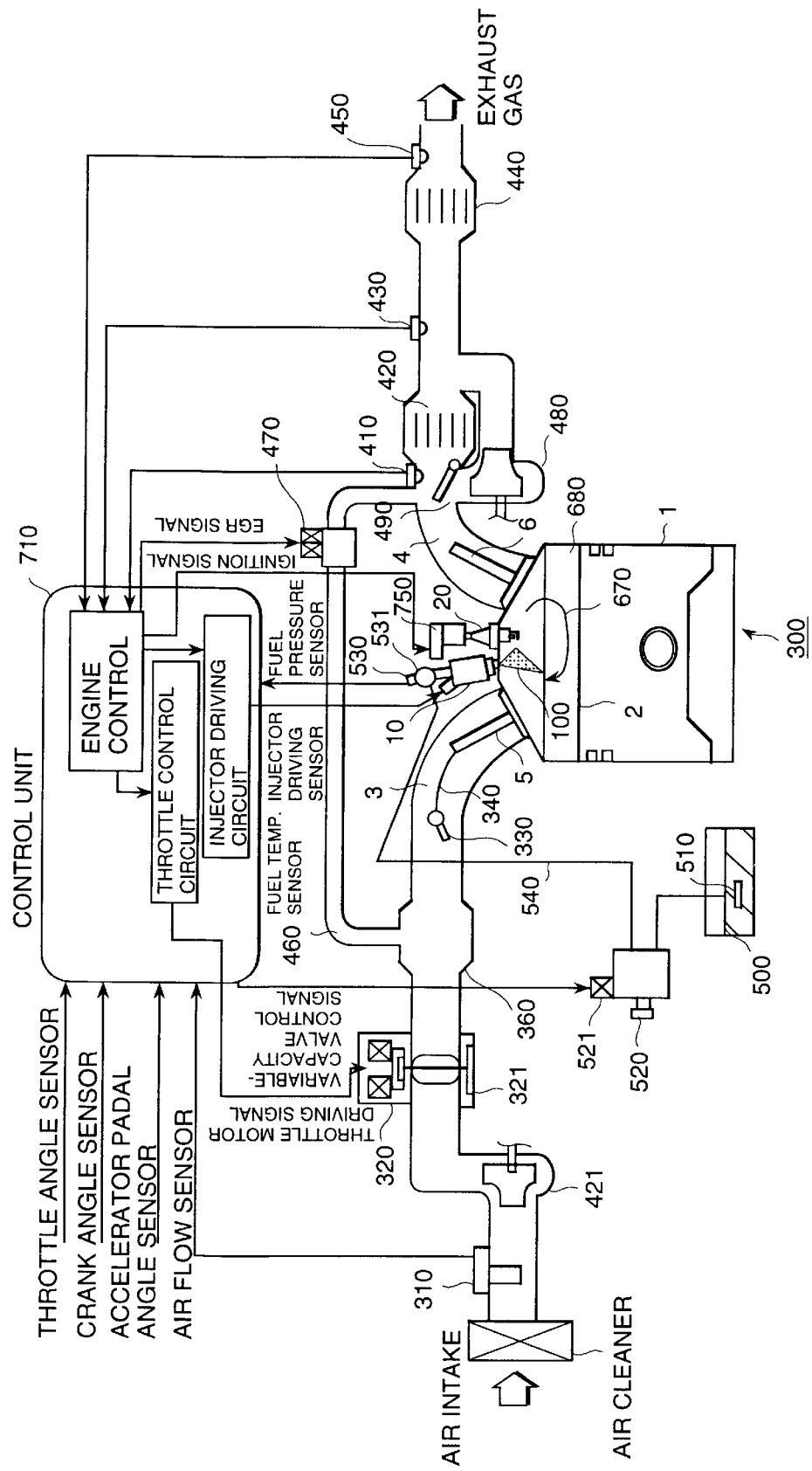
FIG. 29 is a total explanatory diagram of a system in which the present invention is embodied.

The entire system where the present invention is embodied is described below per FIG. 29.

The air intake circuit comprises an air flow sensor 310 for measuring the air intake rate, an electronic control throttle 320 for controlling the air intake rate, a throttle angle sensor 521 for detecting the angle of opening of the throttle, an air flow control valve 330 for creating a tumble (longitudinal swirling flow) within the cylinder 680, a partition plate 340 for separating vertically the air intake channel located under valve 330 (this partition plate is referred to as the double-stepped intake port), and intake valves 5.

Also, a supercharger 421 is mounted between air flow sensor 310 and electronic control throttle 320 and rotated by an exhaust gas turbine 480 located in the exhaust channel.

The exhaust circuit comprises an air-fuel ratio sensor 410 and catalytic converter rhodium 420, which are located in order at the bottom of exhaust valves 6, and an exhaust turbine 480, an exhaust temperature sensor 430, an NOx catalyst 440, and an oxygen concentration sensor 450, which are mounted in parallel with the catalytic converter rhodium 420. A channel 460 for circulating a portion of a combustion exhaust gas from the upstream end of air-fuel ratio sensor 410 to an intake tube collector 360 is also provided so that the NOx emission level is controlled by the recirculation of the exhaust gas.

In addition, an EGR valve 470 for controlling the quantity of circulation of the exhaust gas is provided halfway in the channel 460. Furthermore, an opening/closing valve 490 is mounted at the inlet of exhaust turbine 480 to accelerate early activation of catalytic converter rhodium 420 by blocking the exhaust gas so that it does not flow into exhaust turbine 480 during the start of the engine.

The fuel circuit comprises a fuel injector 10 (in the following description of embodiments, referred to simply as the injector) mounted adjacently to ignition plug 20, a low-pressure feed pump 510 for pumping up a fuel from a fuel tank 500, a high-pressure fuel pump 520 and fuel pipeline 540 for increasing the low fuel pressure and supplying the fuel to injector 10, a fuel pressure sensor 530 installed on a common rail 531 to measure the fuel pressure, a variable-capacity control valve 521 mounted in the intake channel of the high-pressure fuel pump to control the fuel discharge thereof, and a fuel temperature sensor 520 for detecting the fuel temperature.

The ignition circuit comprises an ignition plug 20 installed at the top of a cylinder, and an independent ignition type of igniter-equipped ignition coil unit 750 for supplying a firing high voltage to ignition plug 20.

The piston 2 of engine 1 has a cavity-less flat shape, and swirling air stream 670 within cylinder 680 flows in from a pair of air intake valves 5 provided across ignition plug 20 and then while heading for the bottom of two exhaust valves 6 and the top of piston 2, both streams flow together to form a single forward tumble (longitudinal swirling flow) 670.

After this, the tumble flows into the intake valves 5 along the top of piston 2 and the resulting two streams change into the single air flow that ascends towards the clearance between the two intake valves 5. The corresponding intake air flow, after flowing under the injector 10 and the ignition plug 20, further flows under the clearance between two exhaust valves 400 and both streams flow together as the original tumble 670.

Control unit 710 properly controls the internal combustion of the internal-combustion engine by receiving operational information from various exhaust sensors such as air flow sensor 310, throttle angle sensor 321, crank angle sensor, accelerator pedal sensor, air-fuel ratio sensor 410, fuel temperature sensor 520, and fuel pressure sensor 530, and then sending signals to components such as electronic control throttle 320, injector 10, EGR valve 470, variable-capacity control valve 521, the igniter of ignition coils 750, opening/closing valve 490, and air flow control valve 330.

There are two major methods of controlling combustion: stratified combustion and homogeneous combustion.

Stratified combustion is a combustion control method in which the sprayed fuel is to be stratified and ignited by injecting the fuel under the status that the pressure inside the cylinder 680 during the second half of its compression stroke has increased, and converging the combustible mixture at a position near the ignition plug 20. The stratification of the sprayed fuel enables combustion to take place inside cylinder 680 under a lean status equivalent to an air-fuel ratio of about 40, and thus improves fuel consumption.

Homogeneous combustion is a combustion control method in which the fuel is to be mixed with air into homogeneity during the air intake stroke of the cylinder before being ignited. Since the fuel is injected so that the air-fuel ratio inside the entire cylinder 680 becomes almost the same as a theoretical value, this method ensures high-output operation compared with the operation of the stratified lean-burn engine described above.

The spray of fuel 100 from injector 10 is injected from the upper wall center of the cylinder towards piston 2.

Figure 1:
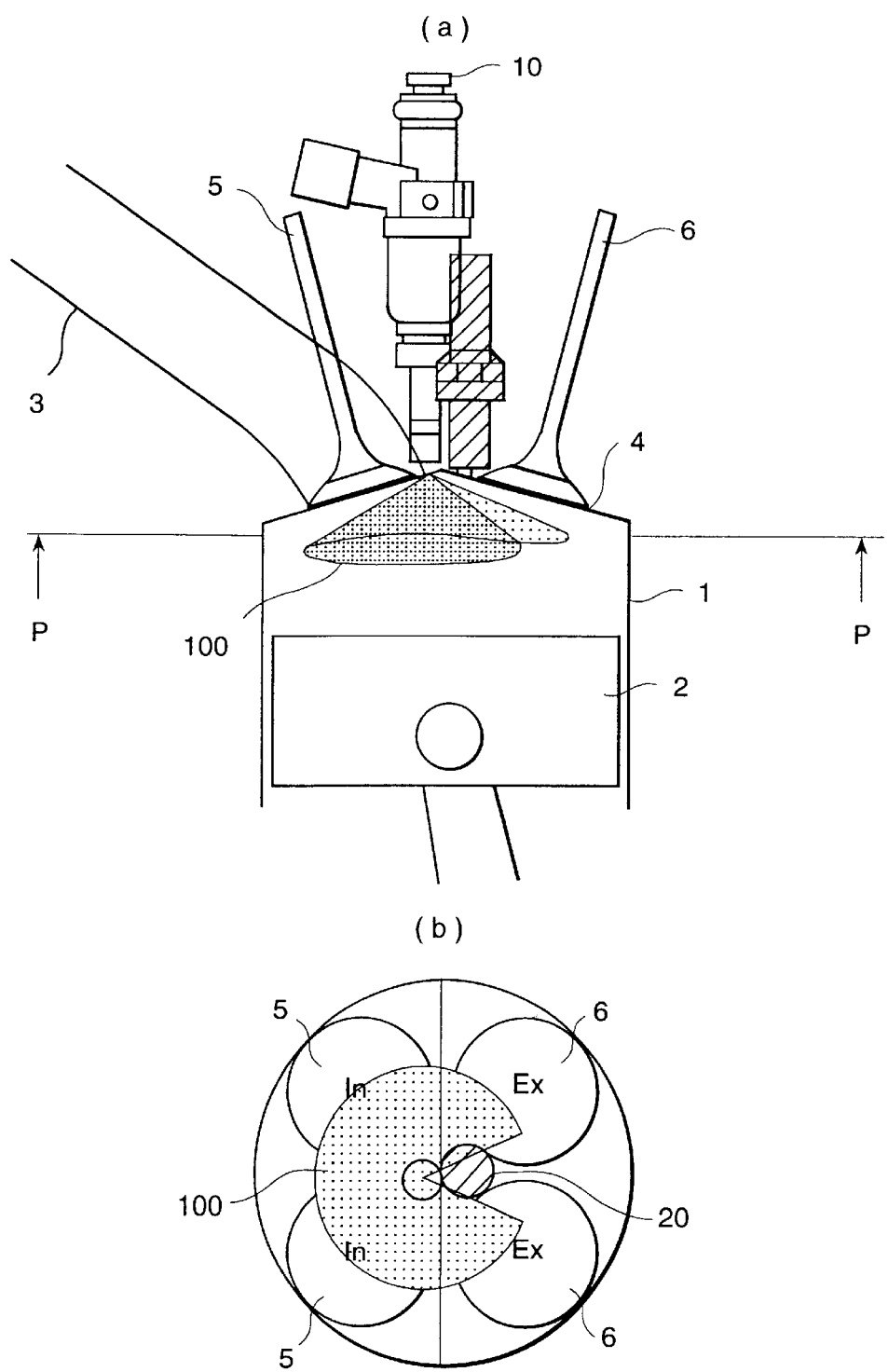
FIG. 1(a) is a cross-sectional view of the engine pertaining to a first embodiment.
FIG. 1(b) is a view of cross section (a) above when seen from the direction of arrow-marked line P–P'.

FIG. 1 is a first embodiment of a direct injection spark ignition engine based on the present invention. Engine 1 has an air intake port 3 and an exhaust port 4, wherein the intake port 3 and the exhaust port 4 are connected through an intake valve 5 and an exhaust valve 6, respectively, to a combustion chamber 680. Numeral 2 is a piston, numeral 20 is an ignition plug provided above the combustion chamber, and numeral 10 is an injector for injecting the fuel directly into the combustion chamber.

Figure 20:
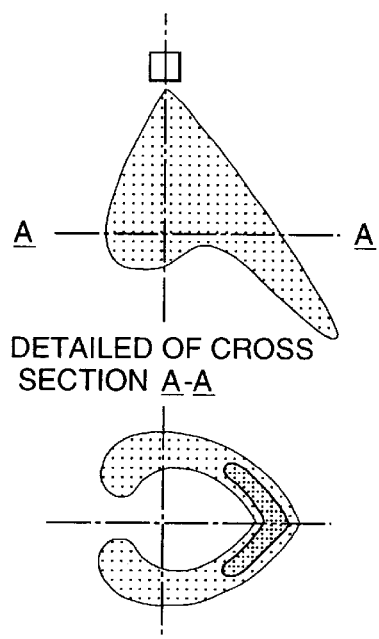
FIG. 20 is a set of views showing the spray pattern of the fuel injected from the injector of FIG. 19.

This engine is a center injection type of direct injection engine injecting the fuel from nearly the center of the combustion chamber towards the piston. The spray of fuel injected from the injector has, for example, the partially incomplete hollow conical shape of a swirl type injector as shown in FIG. 20. That is to say, the present embodiment is characterized in that this spray of fuel consists of a dense fuel portion and a coarse-grained fuel portion, with the coarse-grained fuel portion being directed towards the ignition plug.

Figure 2:
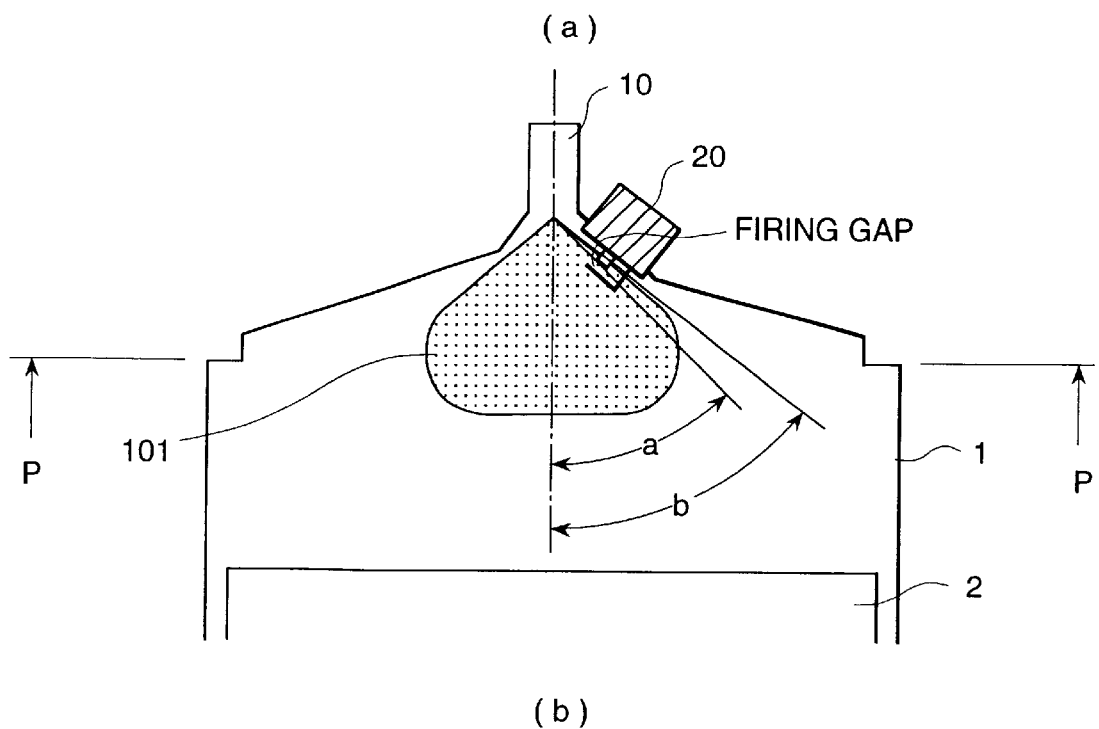
FIG. 2(a) is an explanatory view of the stratified-mixture distribution pertaining to the first embodiment.
FIG. 2(b) is a view of distribution (a) above when seen from the direction of arrow-marked line P–P'.

Also, as shown in FIG. 2, although it is desirable that spray angle "b" should be almost the same as the angle "a" formed between the injection hole of the injector and the electrode of the ignition plug, the spray angle can be adjusted in the range of 0 to 30 degrees, which allows for the upward spread, and the diffusion, of the spray and prevents the fuel from sticking to the wall surface of the combustion chamber geometrically.

The method of verifying the spray of fuel is described below. A spray container measuring at least 300 mm in diameter and at least 300 mm high is injected with 15 mcc/st of fuel, halogen light about 5 mm thick is irradiated from two directions facing one another, at a distance of 40 mm from the injection point on a cross section vertical to the central axis of the injector.

An image of the light which has scattered from the spray of fuel on that cross section is captured using a high-sensitivity camera positioned on the central axis of the injector. The shutter of the camera is set to an open status to prevent unnecessary light from entering. Also, the diaphragm is adjusted for the maximum brightness achievable in the range which does not cause halation. When the maximum luminance of the captured spray image is taken as Imax, the portion of 30% or less of Imax in terms of luminance and the portion of 70% or more of Imax are defined as a coarse-grained spray portion and a dense spray portion, respectively.

Also, the inside of the circle which encompasses the portion of 30% or more of Imax at the maximum distance from the spraying point, with this point as the center, is defined as the spray zone, by which the spray angle is verified.

Next, the operation and working effects of this direct injection engine are described below. In medium/high-load operation of the direct injection engine, fuel is injected during the air intake stroke of the cylinder and a homogeneous mixture is formed, ignited, and burnt. In the present embodiment, since the central axis of the combustion chamber and that of spraying match, the sticking of the fuel to the side walls of the cylinder can be suppressed by spreading out the sprayed fuel in the entire combustion chamber as shown in FIG. 3(*a*).

In addition, although conventional hollow conical spraying has the tendency that when the injection period prolongs during high-load operation, the difference between the inside and outside spraying pressures will reduce the spray angle and the fuel will concentrate on the center of the spray, spraying based on the present invention reduces the inside and outside spraying pressure difference because of air flowing from the coarse-grained spray portion into the spray, and hereby enables the spray angle to be maintained in a wide range, even under high-load conditions.

Thus, as shown in FIG. 3(*b*), the concentration of the spray is avoided and the fuel is widely distributed in the combustion chamber, with the result that the mixing of the fuel with ambient air is accelerated. Even without a flow creating means, the tumble created spontaneously by the shape of the intake ports functions to further accelerate air-fuel mixing. Also, since the coarse-grained portion of the spray is directed towards the ignition plug, the amount of liquid fuel sticking to the plug can be reduced.

In this way, since neither the ignition plug nor the side walls of the combustion chamber are not directly struck with the liquid fuel, the sticking of the liquid fuel to the combustion chamber interior can be reduced, and since the release of HC, soot, and the like improves and this reduces the amount of fuel left in the quench layer, output and fuel consumption also improve.

Figure 4:
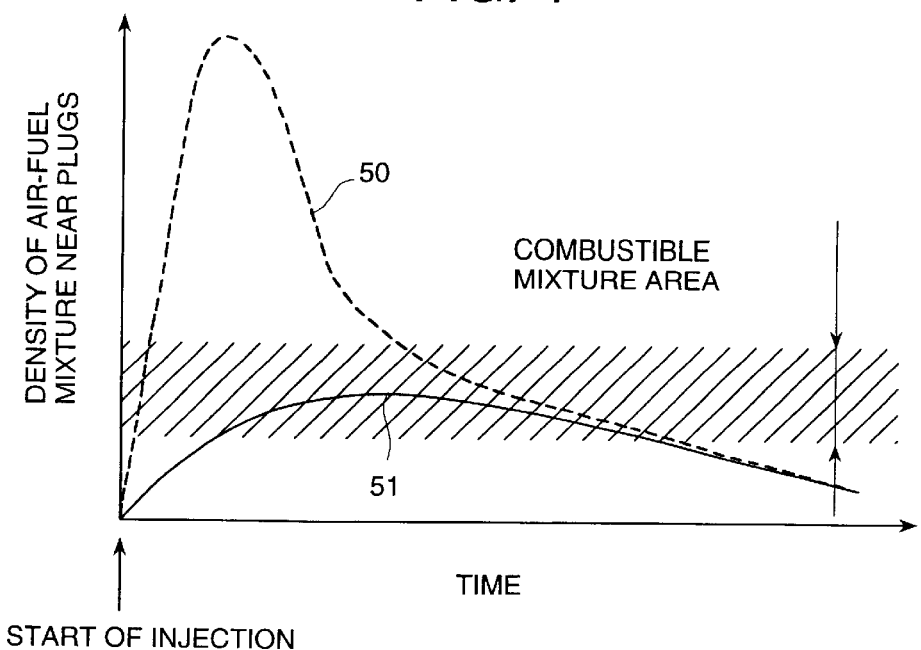
FIG. 4 is an explanatory diagram of changes in the mixture density near the plug.

In low-load operation, on the other hand, as shown in FIG. 2, fuel is injected during the second half of the compression stroke of the cylinder and a mixture is stratified near the plug, with the result that when totally viewed, the air-fuel mixture is burnt under its lean status. Time-varying changes in the mixture density near the ignition plug during compression stroke injection are shown in FIG. 4.

For the hollow conical spray that is formed by a swirl-type injector based on prior art, since the use of wide-angle spraying causes the injected fuel to collide directly with the ignition plug, the liquid fuel directly strikes and sticks to the ignition plug and as a result, the mixture near the plug temporarily assumes an over-dense status.

When droplets of liquid fuel collide with the ignition plug, a liquid membrane will be formed and the liquid fuel that is not vaporized before ignition begins will be burnt intact. This will not only deteriorate exhaust performance, but also cause the ignition plug to misfire because of a combustion product sticking to the plug. The use of coarse-grained and dense spraying based on the present embodiment does not cause the ignition plug to be directly struck with fuel, and therefore, although the mixture density near the ignition plug decreases immediately after injection, the misfiring of the plug can be prevented.

Under the high-pressure atmosphere in the second half of the compression stroke, the penetration of the spray becomes weak and the spray dwells in the center of the combustion chamber, with the result that the mixture, after being vaporized and diffused with the elapse of time, arrives at the ignition plug as a combustible mixture.

Accordingly, as denoted by numeral 51, the time during which the combustible mixture exists near the ignition plug prolongs and a long ignition-enabling period can be achieved. Also, when the sprayed fuel dwells near the ignition plug, an ideal stratified mixture free of sticking to wall surfaces will be formed, which will enable fuel usage without waste, and hence, lean burning of the air-fuel mixture.

Figure 5:
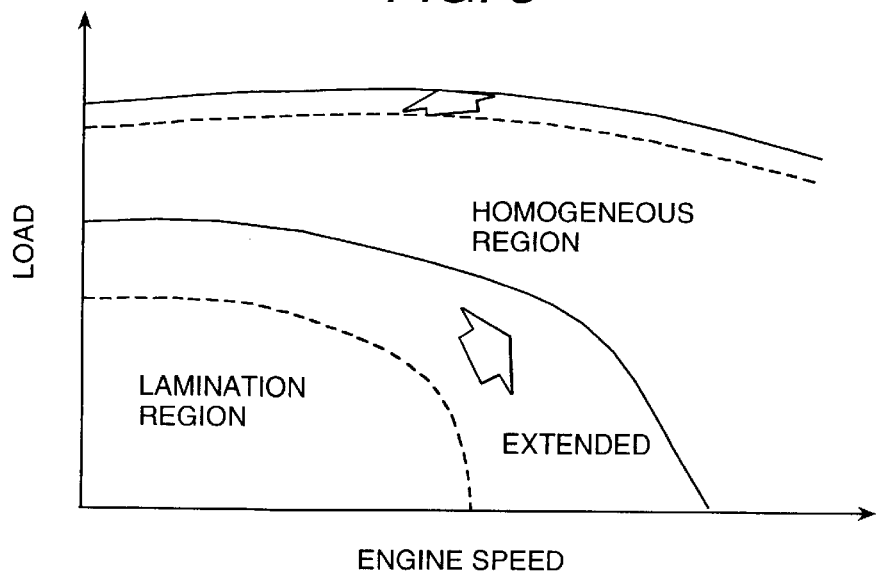
FIG. 5 is an operational characteristics curve explaining the broadening effects of stratification and homogeneous operating regions.

In other words, engine structure based on the present embodiment improves fuel consumption, even during stratified combustion, and enables the emission of unburnt hydrocarbon and other substances to be reduced and the misfiring of the ignition plug to be prevented. FIG. 5 shows the operational status of the engine, namely, the relationship plotted with engine speed and load along the horizontal and vertical axes, respectively.

In the present embodiment, since the time required for the mixture to flow from the injector to the ignition plug does not need to be considered, stratified combustion can be executed, even in the region of relative high engine speeds where the combustion has formerly been difficult, and the stratified operating region where fuel consumption improves can be broadened.

Homogeneous combustion also reduces fuel sticking to wall surfaces and enables the region to be broadened because of the mixture being homogenized. In addition, since combustion can be stratified without depending on air flow, flow creating components are not required and costs can be reduced.

The method of injection control in a center injection type of direct injection engine using the above-described injector is described below. Exhaust performance, fuel consumption, and other engine performance characteristics can be improved by conducting injection control in the engine structure described above.

FIG. 6 shows stratified and homogeneous operating regions under the relationship between engine speed and load. In the high-load high-speed homogeneous operating region shown as region 1, batch injection is started from the air intake stroke for the reason of limited time, as shown in FIG. 7(1).

Figure 8:
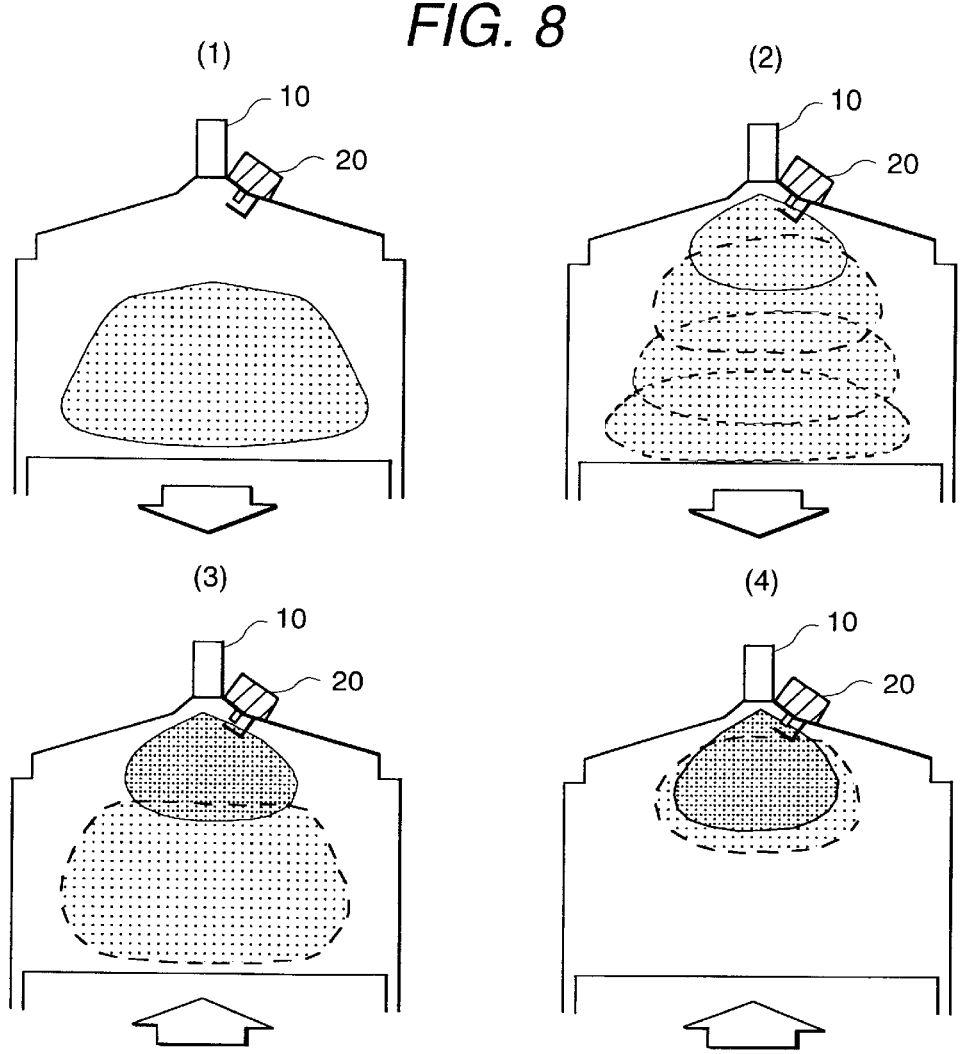
FIG. 8 is a set of views explaining the behavior of a mixture inside the combustion chamber during injection control.

The injection start timing is between 0-degree and 180-degree ATDC of the intake stroke, preferably, at or after 60-degree BTDC where the spray can follow up with the movement of the piston and the sticking of the fuel to wall surfaces can be reduced. Unlike side injection, center injection does not cause the diffusion of the spray to be hindered by strong air flow, and for this reason, the mixture spreads out in the entire combustion chamber as shown in FIG. 8(1), with the result that excellent combustion characteristics can be obtained.

Oil dilution and the occurrence of HC due to the sticking of fuel to the wall surfaces of the cylinder can also be suppressed. Even if the fuel sticks to the crown surface of the piston, since the piston itself is very hot under the operating conditions of region 1, it is likely that the sticking fuel will be vaporized before being ignited and that the exhaust performance of the engine will not be affected significantly.

In the low/medium-speed high-load operating region shown as region 2, fuel is injected in split operations during the air intake stroke. The splitting of the injection into a plurality of operations accelerates the diffusion of the mixture, and the reduction of spray penetration per injection operation reduces the amount of fuel sticking to the crown surface of the piston and suppresses the occurrence of HC and smoke.

Figure 9:
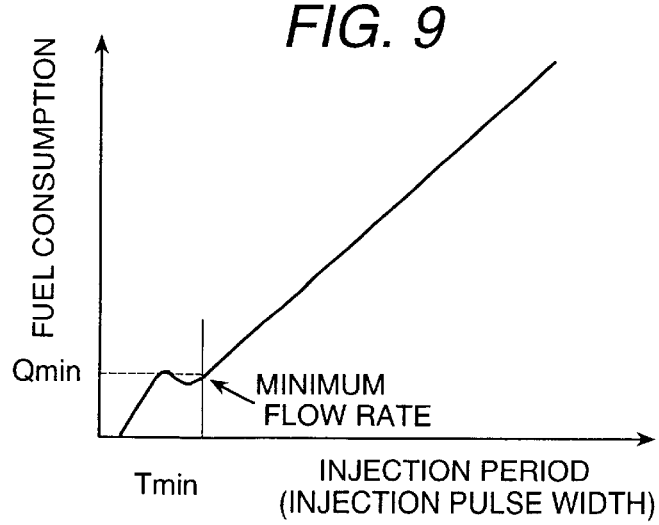
FIG. 9 is a graph explaining the relationship between injection period and fuel flow rate.

It is desirable that the injection be split into operations as many as possible within an injection period close to its minimum value of Tmin with which, as shown in FIG. 9, the required quantity of injection is guaranteed.

Thereby, as shown in FIG. 8(2), the fuel that has been injected during the first half of the intake stroke is distributed in the lower section of the combustion chamber and the fuel that has been injected during the second half of the intake stroke is distributed in the upper section of the combustion chamber, with the result that the nonuniformity of the mixture can be reduced.

In the weak stratification region shown as region 3, fuel is injected in two split operations and in this case, first injection is conducted from the air intake stroke to the first half of the compression stroke and second injection occurs during the second half of the compression stroke.

As shown in FIG. 8(3), a homogeneous lean mixture that permits flames to propagate into the combustion chamber is formed during the first injection, and the second injection is stratified near the plug and ignites the mixture. Second injection time period T2 can take its minimum value with which an ignitable mixture can be formed, and the remainder is assigned to the first injection and the mixture is sufficiently vaporized.

It is desirable that the first injection be conducted as early as possible during the air intake stroke, namely, at the timing between about 30- and 180-degree ATDC, within the range that the conditions under which the sprayed fuel does not collide with the piston are satisfied. The second injection timing should be set to the level between 270-degree and 340-degree ATDC of the compression stroke that enables fuel stratification near the plug.

Also, the injection does not need to be conducted in two split operations, and it can be conducted in more split operations for further accelerated mixing. In the latter case, the mixture can be distributed over the entire combustion chamber by splitting the first injection during the intake stroke. In the case of multiple injection operations, the second injection described above means the final injection.

In the low/medium-speed stratification region shown as region 4, fuel is injected in split operations during the compression stroke as shown in FIG. 7(4). The injection period per operation is shortened to reduce spray penetration, and first injection period D1 and second injection period D2 are set to almost the same time period, with the result of the respective sprays being overlapped for further stratification as shown in FIG. 8(4). Thus, the stratified operating region can be broadened.

In the low/medium-speed stratification region shown as region 5, as with region 4, although injection can be split during the compression stroke, the diffusion of sprays can be controlled, even in the case of batch injection, by setting the injection timing to a level below the high direct pressure during the second half of the compression stroke.

In addition to the injection timing, ignition timing is delayed, which improves combustion efficiency and, hence, fuel consumption. Furthermore, it is effective to set a high direct pressure, even for the same injection timing, and suppress the diffusion of sprays, by opening the throttle and forming a lean mixture from about 40 to 100 in terms of air-fuel ratio.

Increasing the throttle angle reduces the restriction loss of the intake ports and improves fuel consumption. To further increase the direct pressure, it is also effective to adopt supercharging with a supercharger, and even if the injection timing is advanced, the high direct pressure will suppress the diffusion of sprays and the long time from injection to ignition will accelerate vaporization.

To implement multiple-split injection described above, the injector needs to be driven at high speed. Therefore, it is valid to combine an injector that can be driven using a battery whose recharging is not required, or a rapid-response injector that uses piezoelectric elements/magnetostrictive elements.

Next, the method of controlling the supply fuel pressure is described below. For the engine structure described above, since the injection point and the ignition point are close, it is desirable that the fuel that has been atomized from the initial period of injection should be supplied for accelerated vaporization.

Figure 10:
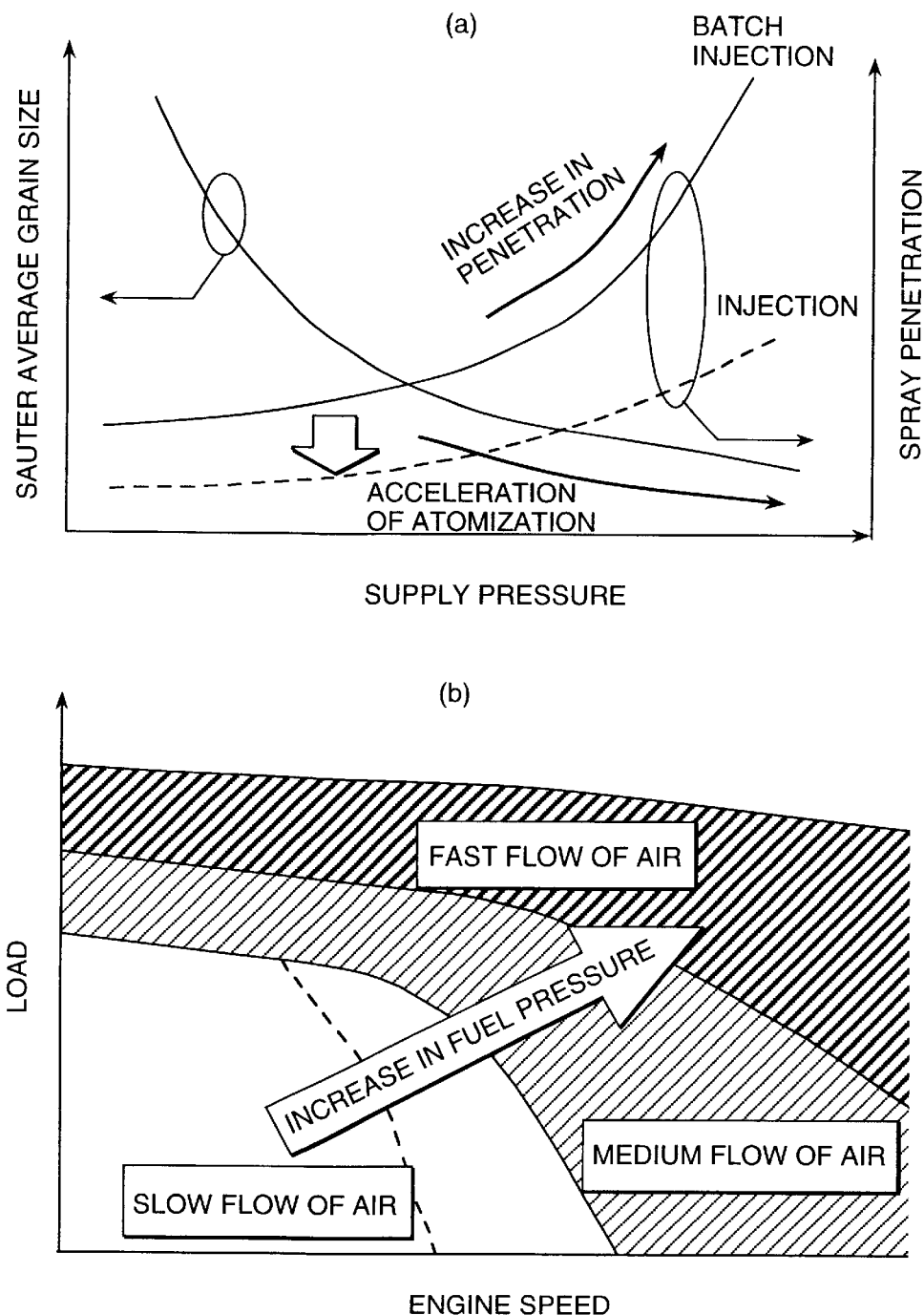
FIG. 10(a) is a chart explaining the relationship between fuel pressure, average grain size, and spray penetration.
FIG. 10(b) is a diagram explaining the relationship between air flow and fuel pressure, based on the operating conditions of the engine.

As shown in FIG. 10, atomization and spray penetration are maintained in the trade-off relationship that although an increase in fuel supply pressure usually accelerates atomization, penetration increases correspondingly. To reduce spray penetration, it is valid to inject the fuel in multiple split operations as described above. Split injection reduces penetration while at the same time maintaining the grain size of the sprayed fuel, as shown in the figure.

During high-speed homogeneous rotation in region 1, since a sufficient vaporizing time cannot be obtained, the fuel supply pressure increases 10 to 20 MPa to accelerate atomization. The increase in the supply pressure increases the injection ratio and correspondingly reduces the injection period, with the consequence that the suppression of penetration and the homogenization of the combustion chamber internal status can be realized by employing split injection formerly difficult because of limited time.

During medium/low-speed homogeneous rotation in region 2, weak stratification rotation in region 3, and medium-speed rotation in region 4, above-mentioned split injection occurs at ordinary fuel pressure from 5 to 12 MPa.

During low-speed homogeneous rotation in region 5, although split injection has formerly been difficult because of a short injection period, the injection period can be prolonged by reducing the supply fuel pressure to a level of 1 to 5 MPa to enable split injection.

Although the reduction of the fuel pressure deteriorates performance in terms of grain size, since low-speed rotation permits the extension of the time from injection to ignition, a large portion of the fuel can be vaporized before ignition is started, provided that stratification near the plug can be maintained. Also, the degree of stratification can be enhanced by overlapping the sprays of fuel by use of split injection.

Next, the control of air flow is described. Assigning air flow to the engine described above enables engine performance to be improved.

Figure 11:
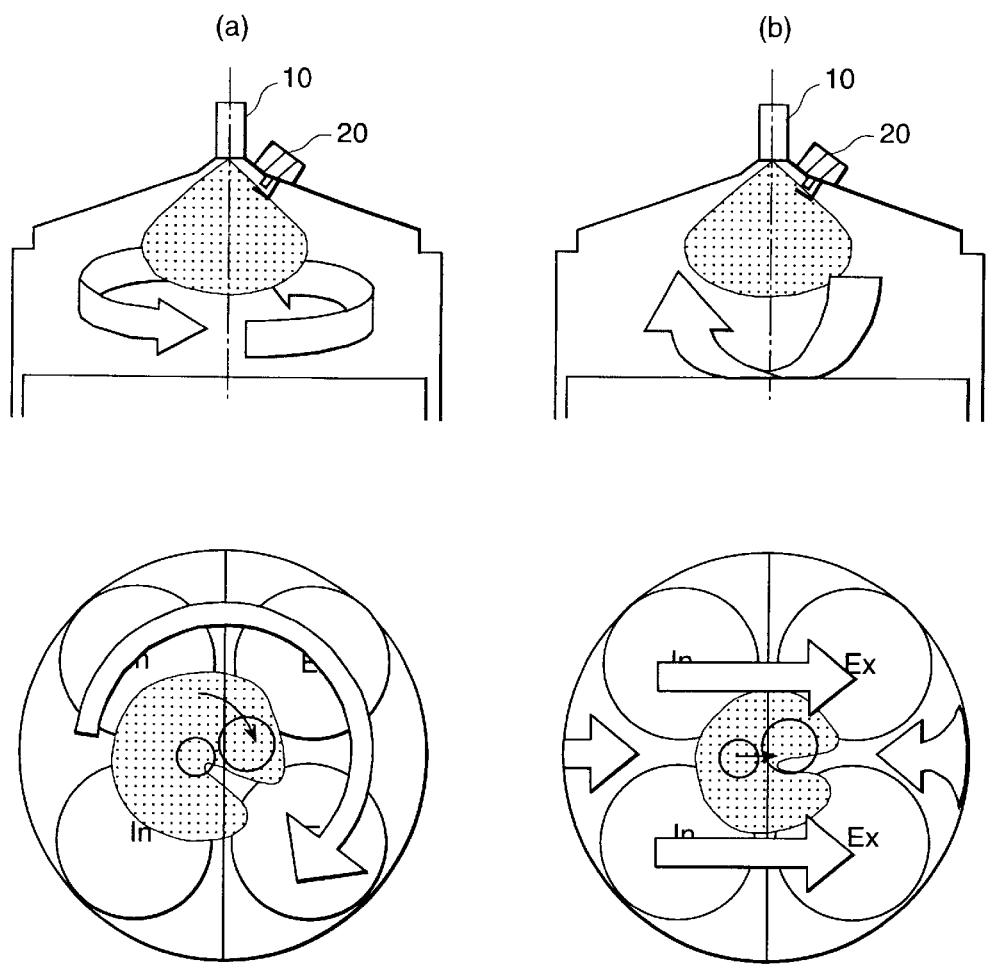
FIG. 11 is a set of views which explain combinations of air flow and fuel injection control based on the present invention; (a) explaining a combination with a swirl (lateral swirling flow) and (b) explaining a combination with a tumble (longitudinal swirling flow)

When lateral swirling air flow is assigned to the combustion chamber as shown in FIG. 11($a$), the sticking of the fuel to wall surfaces during homogeneous combustion in regions 1 and 2 can be suppressed and this accelerates air-fuel mixing and enables a more homogeneous mixture to be obtained.

In the case of stratified combustion in regions 3 and 4, although the spray of fuel towards the plug during injection is coarse-grained, the mixture that has been vaporized as shown in the figure can be transported to the plug by means of swirling. Also, since a turbulence is created, this leads to the acceleration of vaporization and enables combustion to be stabilized and HC to be reduced.

In addition, swirling creates, just like the eye of a severe tropical storm, a weak flow of air in the center of the injector-equipped combustion chamber and enables the air-fuel mixture to be retained without being diffused like a tumble. For stratification, therefore, swirling is desirable.

The same also applies when, as shown in FIG. 11($b$), a tumble, or a vertical vortex, is assigned, and during homogeneous combustion, mixing is accelerated and during stratified combustion, the mixture is transported to the plug. For split injection in stratified combustion mode, however, a weak flow of air needs to be assigned, since the mixture is transported to the exhaust circuit without dwelling halfway.

Figure 12:
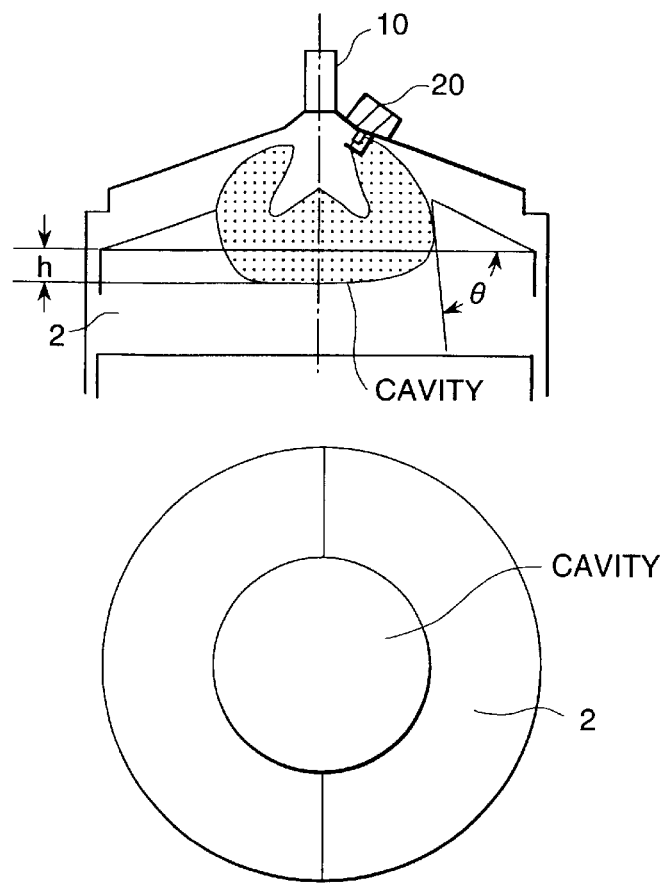
FIG. 12 is a diagram explaining an application of the present invention using a piston equipped with a cavity.

Such cavity as shown in FIG. 12 can also be provided in the piston to prevent the mixture from diffusing. Although it is desirable that the fuel should not stick, if the sprayed fuel collides with the piston during stratified combustion and the piston has a flat surface, it is likely that the fuel will diffuse into the combustion chamber along the crown surface of the piston and thus that a mixture will be formed in the quench layer.

With a cavity, the spayed fuel can be swirled upward in the direction of the plug along the curves of the wall surfaces and consequently, the mixture can be stratified more easily.

At this time, the edge angle $\theta$ of the cavity and the depth H thereof affect the formation of the mixture. Since $\theta$ determines the direction in which the sprayed fuel will be headed after flowing out from the cavity, $\theta$ should be set to an angle of 70 to 150 degrees at which the mixture can be transported in the direction of the plug. It is desirable that in view of cooling loss, the depth H of the cavity should be a small value.

In terms of the relationship in mounting position between the injector and ignition plug, the distance from the top face of the combustion chamber and/or the configuration in the mounting direction can also be changed. It is possible to mount the ignition plug between two air intake valves. Also, although the present embodiment relates to a four-valve engine, it is possible to reduce the number of valves to two or three and make effective use of the resulting spatial margin around the cylinder head to arrange the injector and the plug there.

In addition, the mixture can be transported to the ignition plug more easily by mounting the injector at a distance of about 0 to 40 mm from the position of the ignition plug and positioning the plug at where the sprayed fuel will be swirled upward by friction with ambient air.

Figure 13:
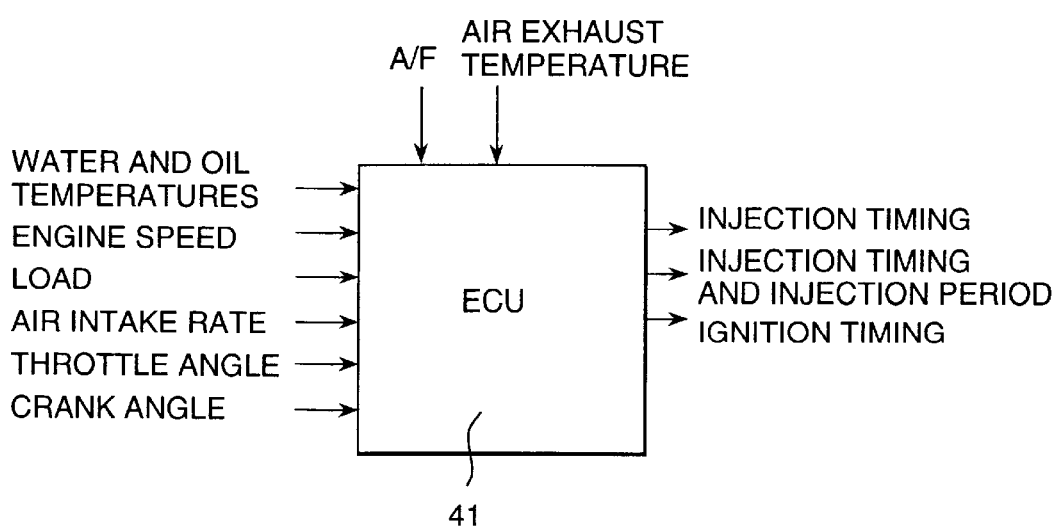
FIG. 13 is a block diagram showing the input and output signals of an engine control unit.

Engine control unit (ECU) 710, after receiving an air intake rate control signal, an engine coolant temperature control signal, a fuel temperature control signal, a fuel pressure control signal, an engine speed control signal, a load control signal, a throttle angle control signal, a crank angle control signal, an air-fuel ratio control signal, an exhaust temperature control signal, and other control signals from the engine-mounted sensors as shown in FIG. 13, identifies the status of the engine.

Figure 14:
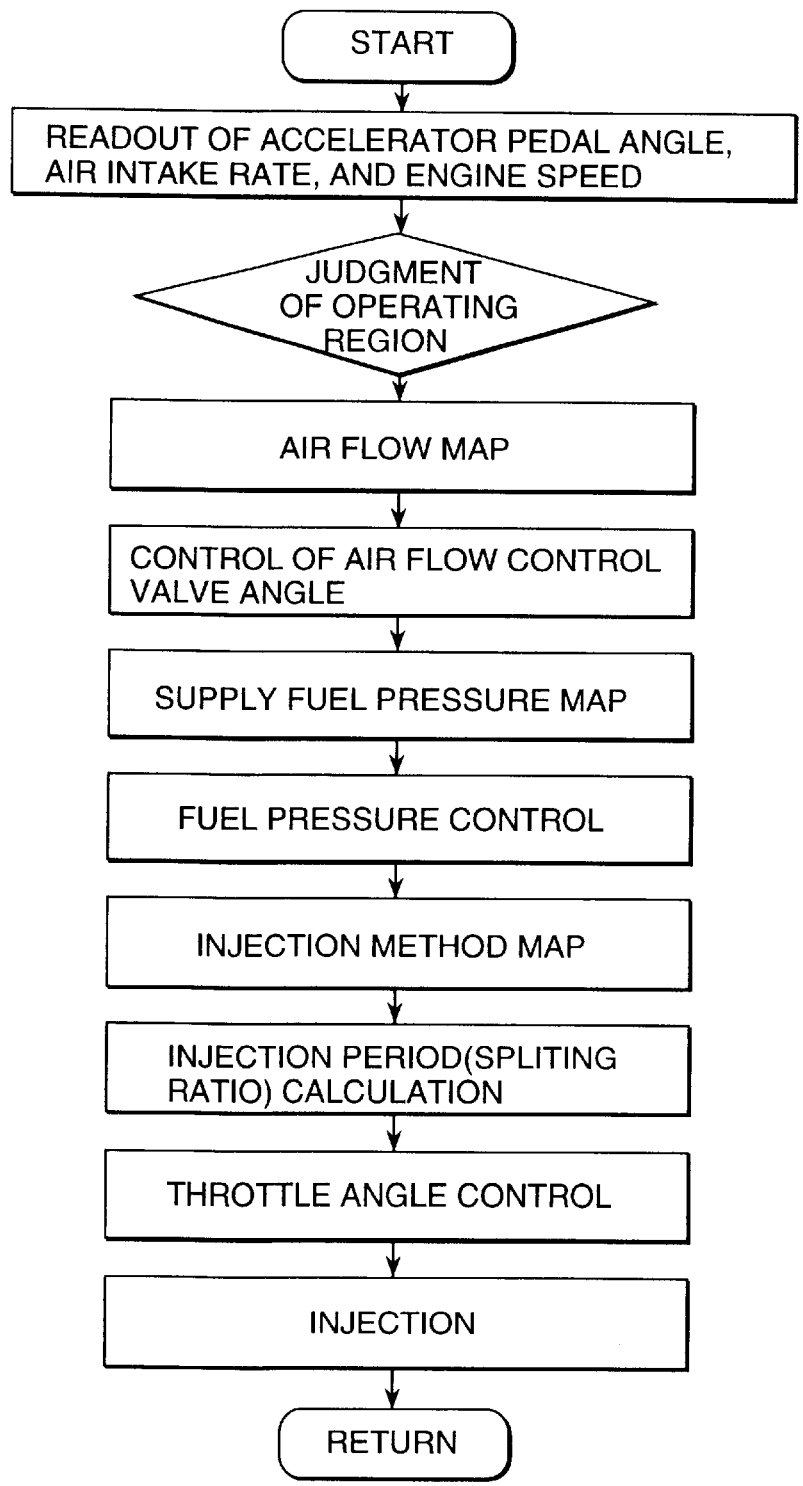
FIG. 14 is a flowchart showing an example of operation up to completion of injection.

Then after analyzing the results, determines the appropriate injection timing, injection period, fuel pressure, air flow control valve angle, etc. from such map of injection method as shown in FIG. 6 and such map of air flow states and fuel pressures as shown in FIG. 10(b), and sends the above-mentioned control signals to the engine control units in accordance with the flowchart of FIG. 14.

A second embodiment of the present invention is shown in FIG. 15. As with the first embodiment, the second embodiment relates to a center injection type of direct injection engine having an injector disposed near the center of its combustion chamber, and in this engine, the portion of the injector that corresponds to the spray concentrating portion of such spray pattern as shown in FIG. 20 is disposed so as to face in the direction of the ignition plug, at the opposite side to the portion corresponding to the notched spray portion of the spray pattern.

At this time, the spray angle "b" of the fuel with respect to the angle "a" formed between the injection hole of the injector and the electrode of the ignition plug is set to a small value from 10 to 30 degrees in order to avoid the collision of the fuel with the ignition plug.

Figure 16:
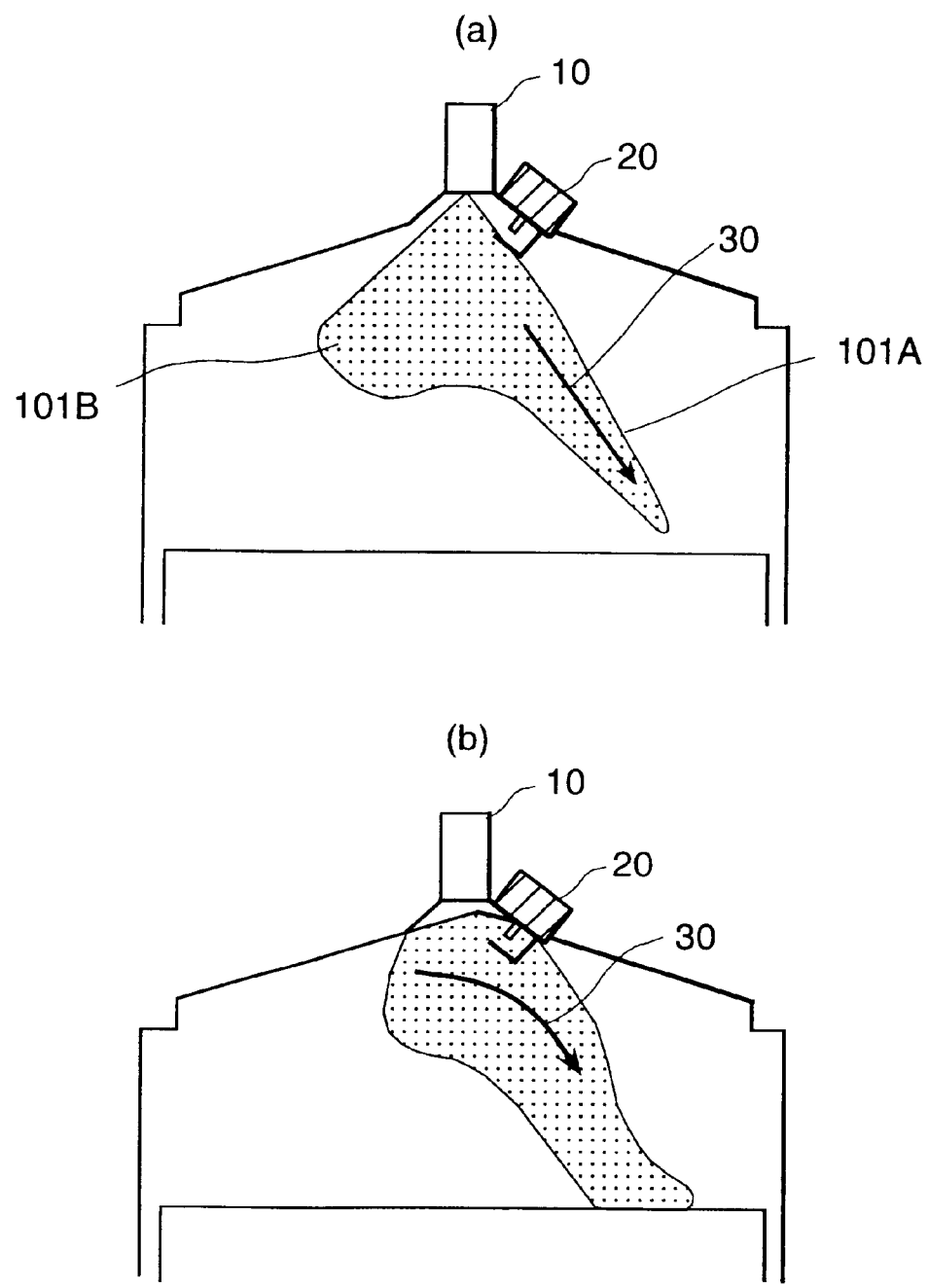
FIG. 16(a) is an explanatory view of the mixture distribution obtained during the initial phase of spraying based on the first embodiment.
FIG. 16(b) is an explanatory view of the mixture distribution obtained toward the end of spraying.

Working effects are described using FIG. 16. A portion at which the sprayed fuel concentrates and its velocity increases is taken as spray 101A, and a portion provided at the side facing the above-mentioned portion and at which the velocity of the sprayed fuel decreases is taken as spray 101B.

As shown in FIG. 16(a), inside the combustion chamber, air flow 30 from the ignition plug towards the piston is created from 101A, and as shown in FIG. 16(b), 101B meets flow 30 and both move to a position near the ignition plug. Since the flow is created from the spray, a vaporized mixture can be stratified at the ignition plug, even without initial flow of air.

Although 101A moves past the neighborhood of the ignition plug in dripping form, a misfire does not occur since the small spray angle prevents collision with the ignition plug. The portion actually used for ignition is 101B, and this portion is likely to be vaporized before it arrives at the ignition plug. It has been verified that the effectiveness of the present embodiment is much the same as that of the first embodiment.

Figure 17:
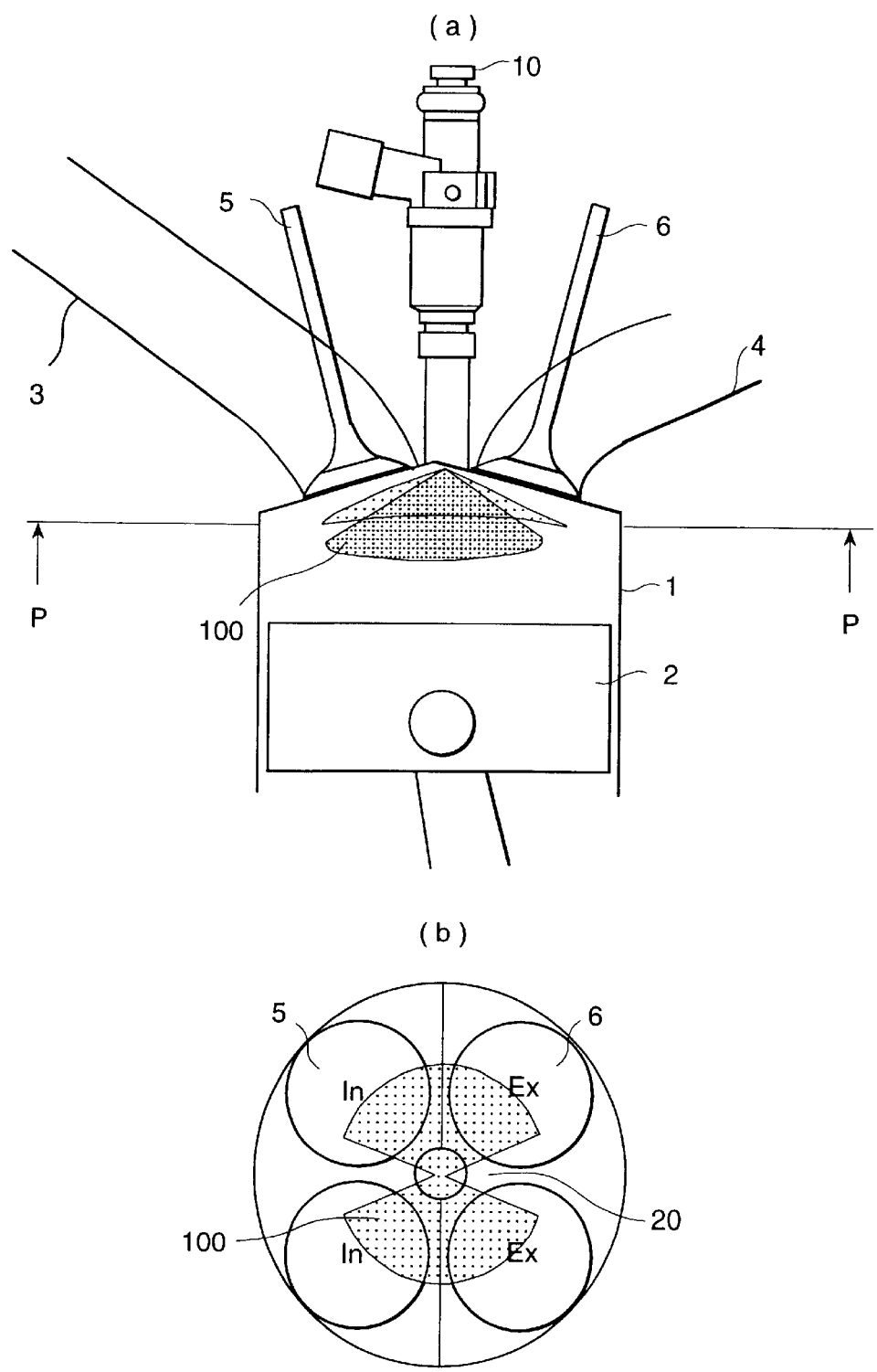
FIG. 17(a) is a cross-sectional view of the engine pertaining to a third embodiment.
FIG. 17(b) is a view of cross section (a) above when seen from the direction of arrow-marked line P–P'.

A block diagram of a third embodiment is shown in FIG. 17, wherein the injector and the ignition plug are integrated into a single unit. Although arranging the injector and the ignition plug on the cylinder head requires modifying the head extensively, the mounting spaces for the injector and ignition plug can be saved by integrating both.

Similarly to this, in the configuration shown in FIG. 17, the coarse-grained portion of the sprayed fuel is directed towards the electrode portion of the ignition plug to prevent a liquid fuel from directly striking the ignition plug. Description of working effects is omitted since they are almost the same as those of the first embodiment.

FIG. 18 is a block diagram of the injector used in the above embodiment. The operation of the injector is described below. Valve body 14, when losing the valve, is sealed by being pressed against valve seat 16 by the action of a spring 60. When the valve opening signal is given from ECU, a magnetic circuit is formed by a coil unit 61 and as a result, electromagnetic force is generated in the direction that the magnetic portion 62 of valve body 14 is to be lifted.

Thus, the valve body moves upward. Fuel flows in from the top of the injector, then passes through the internal channel 63 of the valve body, and arrives at nozzle 11. The nozzle contains a swirler 12 for rotating the fuel, and the fuel flows through a groove 13 provided in the swirler and is injected from the clearance between valve body 14 and valve seat 15 via injection hole 16 into the combustion chamber.

Figure 19:
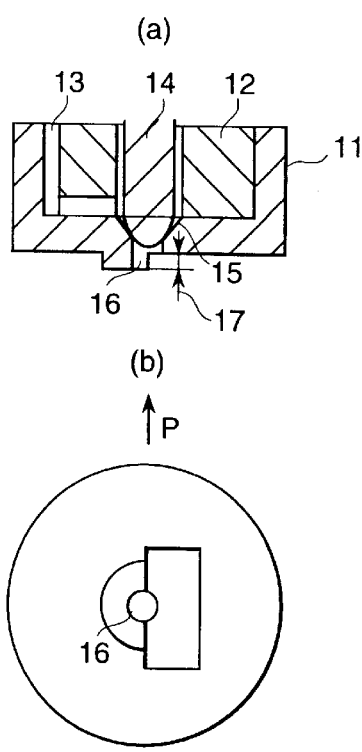
FIG. 19(a) is an enlarged cross-sectional view of the end portion of the injector used in the first embodiment.
FIG. 19(b) is a cross-sectional view of end portion (a) above when seen from the direction of arrow P.

Nozzle shape 1 of the injector is shown in FIG. 19. This nozzle has a level difference 17 in the half portion of the injection hole. In this configuration, a discontinuous portion is formed in a portion of the hollow spray of fuel injected from the conventional rotational-type injector, and consequently, coarse and dense portions occur in the distribution of sprays.

FIG. 20 shows the spray pattern created from the injection hole of FIG. 11, with the upper diagram showing the spray pattern in vertical section and the lower diagram showing the pattern in horizontal section. One of the two sprays of fuel injected from this injector takes a discontinuous and coarse-grained status, and the other spray of fuel takes a dense status.

The position and quantity of this coarse-and-dense distribution can be changed according to the particular size and position of the level difference provided in the nozzle. The first embodiment set forth above is intended to direct the coarse-grained spray portion towards the ignition plug, and the second embodiment is intended to direct the high-velocity dense spray portion, which is formed at the opposite side to the coarse-grained spray portion, towards the ignition plug.

Figure 21:
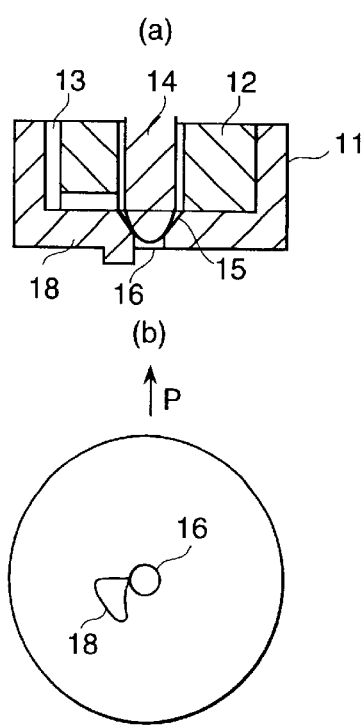
FIG. 21(a) is an enlarged cross-sectional view of the end portion of the injector used in the second embodiment.
FIG. 21(b) is a cross-sectional view of end portion (a) above when seen from the direction of arrow P.
Figure 22:
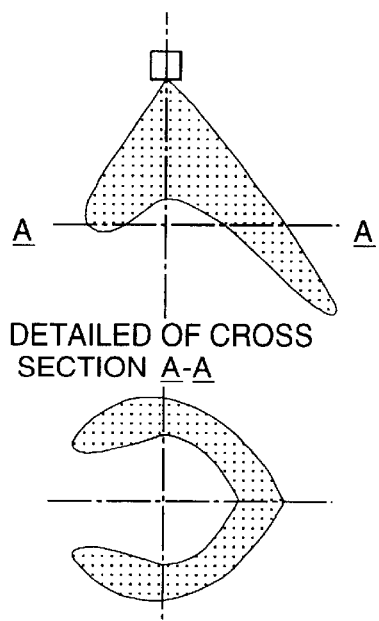
FIG. 22 is a set of views showing the spray pattern of the fuel injected from the injector of FIG. 21.

Nozzle shape 2 of the injector is shown in FIG. 21. A barrier 18 is formed at the outlet of the injection hole in order for the nozzle to have a shape as if a portion of a hollow conical spray of fuel were cut off at an angle of about 90 degrees as shown in FIG. 22. In the first embodiment, the portion corresponding to the coarse-grained cutoff portion of the spray is directed towards the ignition plug.

Figure 23:
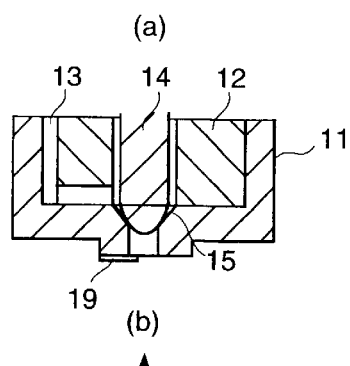
FIG. 23(a) is an enlarged cross-sectional view of the end portion of the injector of FIG. 18 in the third embodiment.
FIG. 23(b) is a cross-sectional view of end portion (a) above when seen from the direction of arrow P.
Figure 24:
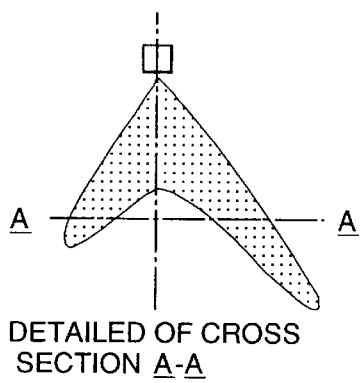
FIG. 24 is a set of views showing the spray pattern of the fuel injected from the injector of FIG. 23.

Nozzle shape 3 of the injector is shown in FIG. 23. At least one or more barriers 19 are provided at a portion of the injection hole outlet, and a coarse-grained spray can likewise be formed by cutting off a portion of a spray of fuel as shown in FIG. 24. The size of the coarse-grained spray portion can be changed according to the particular width and height of each barrier. In this case as well, under the first embodiment, the portion corresponding to the coarse-grained cutoff portion of the spray is directed towards the ignition plug.

Figure 25:
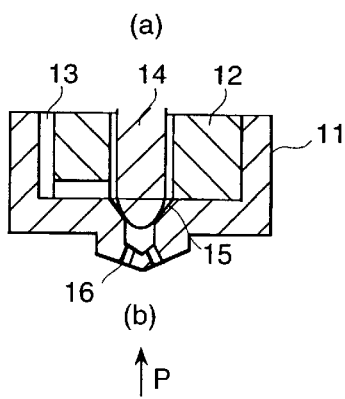
FIG. 25(a) is an enlarged cross-sectional view of the end portion of the injector of FIG. 18 in a fourth embodiment.
FIG. 25(b) is a cross-sectional view of end portion (a) above when seen from the direction of arrow P.
Figure 26:
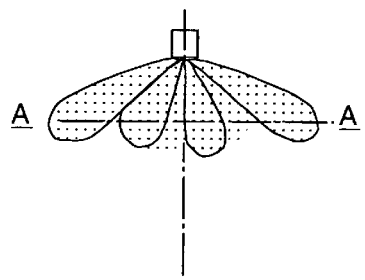
FIG. 26 is a set of views showing the spray pattern of the fuel injected from the injector of FIG. 25.

Nozzle shape 4 of the injector is shown in FIG. 25. In this injector configuration, the nozzle portion 16 of the injector is porous and as shown in FIG. 26, coarse and dense sprays of fuel to be injected in a multitude of directions are formed. A variety of coarse and dense sprays of fuel can be formed according to the number of injection holes and the particular size and direction of the holes.

When this configuration is applied to the first embodiment, the ignition plug is to be disposed at the portion corresponding to the coarse-grained spray of fuel between the sprays of fuel injected from each injection hole. Or as shown in FIG. 27, the diameter of one, or more than one, injection hole is to be set to a value smaller than that of others and as shown in FIG. 28, the portion corresponding to a spray portion low in flow rate is to be directed towards the ignition plug.

To apply the above configuration to the second embodiment, the diameter of one, or more than one, injection hole is to be set to a value larger than that of others and the portion corresponding to a spray portion high in velocity is to be directed towards the ignition plug at the angle that the plug will not be directly struck with the fuel. Thus, the flow of air is to be created inside the combustion chamber. In the case of the porous injector, the air-fuel mixture does not always need to be rotated upstream.

The injector used in the present invention is provided with a means for determining the injector mounting position. For example, the mounting hole for the injector also functions as a safety lock provided on the outer surface of the injector.

The positioning means can likewise be constructed by providing a mark on the connector of the injector or on a separate injector, and a mark on the cylinder head. Marks can also be provided between adjacent ignition plug mounting holes. Such positioning guarantees that the coarse-grained spray portion of fuel is disposed at the position corresponding to the ignition plug without fail.

Furthermore, it is preferable that the respective positions of the ignition plug and the injector should be set in order for the firing gap of the plug to face in the direction of the injector as represented in FIGS. 2 and 3. In the present invention, the plug can be mounted with such directivity since, as set forth above, the firing gap is not directly wetted with a liquid fuel. Hence, firing performance improves since a vaporized mixture is supplied directly to the firing gap.

In the present invention, since the fuel injector is constructed so that despite its installation in the vicinity of an ignition plug, the injector does not directly collide with the ignition plug, high exhaust performance and stratified combustion can be achieved without the ignition plug misfiring.

What is claimed is:

1. A direct injection gasoline engine for directly injecting a fuel into a cylinder from a fuel injector; said direct injection gasoline engine having said fuel injector mounted in the neighborhood of an ignition plug, and being installed in such a manner that the fuel injector is constructed so as to achieve a nonuniform fuel distribution in a circumferential direction with respect to a spraying axis of the fuel injector and that a coarse portion of the distribution corresponds to said ignition plug.

2. A fuel injector to be used for a direct injection gasoline engine which injects a fuel directly into a cylinder from a fuel injector mounted in the neighborhood of an ignition plug; said fuel injector being constructed so as to achieve a nonuniform fuel distribution in a circumferential direction with respect to a spraying axis of the fuel injector, and being equipped with a means for positioning the fuel injector so that when the engine is mounted, a coarse-grained portion of the fuel sprayed will correspond to said ignition plug.

3. A direct injection gasoline engine comprising
  a combustion chamber formed between a cylinder head and a piston, an ignition plug, and an injector provided near the upper center of said combustion chamber and injecting gasoline directly into the combustion chamber,
  wherein said direct injection gasoline engine is characterized in that an injector for creating coarse-grained and dense sprays of fuel is combined, with the coarse-grained spray being directed towards the ignition plug.

4. The direct injection gasoline engine set forth in claim 3 above, wherein the engine is characterized in that the angle of spraying is increased from −30 degrees to +30 degrees with respect to the tangent line connecting an injection point and the electrode of an ignition plug.

5. The direct injection gasoline engine set forth in claim 3, wherein the engine is characterized in that said injector is constructed so as to have a stepped portion in the direction of the injector central axis at the open exit end of the injection hole.

6. The direct injection gasoline engine set forth in claim 3, wherein the engine is characterized in that said injector is constructed so as to have a plurality of injection holes.

7. The direct injection gasoline engine set forth in claim 3, wherein the engine is characterized in that said injector is constructed so as to have a shielding plate at one portion of the injection hole and cut one portion of sprayed gasoline.

8. The direct injection gasoline engine set forth in claim 3, wherein the engine is characterized in that said injector and the ignition plug are integrated into a single unit.

9. The direct injection gasoline engine set forth in claim 3, wherein the engine is characterized in that a fuel is injected a plurality of times during one cycle consisting of air intake, compression, expansion, and exhaust.

10. The direct injection gasoline engine set forth in claim 3, wherein the engine is characterized in that a fuel is injected in a plurality of split operations at a high fuel pressure from 10 to 20 MPa during homogeneous combustion at high engine speed and high load.

11. The direct injection gasoline engine set forth in claim 3, wherein the engine is characterized in that a fuel is injected in a plurality of split operations at a low fuel pressure from 1 to 5 MPa during stratified combustion at low engine speed and low load.

12. The direct injection gasoline engine set forth in claim 3, wherein the engine is characterized in that it is provided with a flow control means to create swirling air flow.

13. The direct injection gasoline engine set forth in claim 12, above, wherein the engine is characterized in that control is provided so as to enhance swirling intensity with increases in engine speed and load.

14. The direct injection gasoline engine set forth in claim 3, wherein the engine is characterized in that it is provided with a flow control means to create tumble air flow.

15. The direct injection gasoline engine set forth in claim 14 above, wherein the engine is characterized in that control is provided so as to enhance tumble intensity with increases in engine speed and load.

16. The direct injection gasoline engine set forth in claim 3, wherein the engine is characterized in that the crown surface of its piston has a cavity.

17. The direct injection gasoline engine set forth in claim 16 above, wherein the engine is characterized in that the end face of the cavity provided at the crest of the piston and the horizontal face of the piston form an angle from 70 to 150 degrees.

18. The direct injection gasoline engine set forth in claim 3, wherein the engine is characterized in that it has a supercharger.

19. The direct injection gasoline engine set forth in claim 3, wherein the engine is characterized in that it has a catalyst and a turbo type supercharger.

20. A direct injection gasoline engine comprising
  a combustion chamber formed between a cylinder head and a piston, an ignition plug for firing an air-fuel mixture, and an injector provided near the upper center of said combustion chamber and injecting gasoline directly into the combustion chamber,
  wherein said direct injection gasoline engine is characterized in that it is constructed in order for a dense spray of gasoline to be directed towards said ignition plug and for the following coarse-grained spray to enclose the ignition plug.

21. The direct injection gasoline engine set forth in claim 20 above, wherein the engine is characterized in that the angle of spraying is reduced from 90 degrees to 10 degrees with respect to the tangent line connecting an injection point and the electrode of an ignition plug.

22. The direct injection gasoline engine set forth in claim 20, wherein the engine is characterized in that said injector is constructed so as to have a stepped portion in the direction of the injector central axis at the open exit end of the injection hole.

23. The direct injection gasoline engine set forth in claim 20, wherein the engine is characterized in that said injector is constructed so as to have a plurality of injection holes.

24. The direct injection gasoline engine set forth in claim 20, wherein the engine is characterized in that said injector is constructed so as to have a shielding plate at one portion of the injection hole and cut one portion of sprayed gasoline.

25. The direct injection gasoline engine set forth in claim 20, wherein the engine is characterized in that said injector and the ignition plug are integrated into a single unit.

26. The direct injection gasoline engine set forth in claim 20, wherein the engine is characterized in that a fuel is injected a plurality of times during one cycle consisting of air intake, compression, expansion, and exhaust.

27. The direct injection gasoline engine set forth in claim 20, wherein the engine is characterized in that a fuel is injected in a plurality of split operations at a high fuel pressure from 10 to 20 MPa during homogeneous combustion at high engine speed and high load.

28. The direct injection gasoline engine set forth in claim 20, wherein the engine is characterized in that a fuel is injected in a plurality of split operations at a low fuel pressure from 1 to 5 MPa during stratified combustion at low engine speed and low load.

29. The direct injection gasoline engine set forth in claim 20, wherein the engine is characterized in that it is provided with a flow control means to create swirling air flow.

30. The direct injection gasoline engine set forth in claim 20, wherein the engine is characterized in that it is provided with a flow control means to create tumble air flow.

31. The direct injection gasoline engine set forth in claim 20, wherein the engine is characterized in that the crown surface of its piston has a cavity.

32. The direct injection gasoline engine set forth in claim 20, wherein the engine is characterized in that it has a supercharger.

33. The direct injection gasoline engine set forth in claim 20, wherein the engine is characterized in that it has a catalyst and a turbo type supercharger.

* * * * *